United States Patent [19]
Howse

[11] 4,229,057
[45] Oct. 21, 1980

[54] BEARINGS
[75] Inventor: Ronald N. Howse, Waltham St. Lawrence, Nr. Reading, England
[73] Assignee: Vandervell Products Limited, Maidenhead, England
[21] Appl. No.: 30,730
[22] Filed: Apr. 17, 1979
[30] Foreign Application Priority Data
Apr. 21, 1978 [GB] United Kingdom ............... 15818/78
[51] Int. Cl.³ .................. B61F 15/02; F16C 17/10
[52] U.S. Cl. .................................. 308/161; 308/53; 308/79.1; 308/172
[58] Field of Search ............... 308/38, 40, 41, 53, 308/56, 57, 79.1, 79, 161, 162, 163, 165, 168, 171, 172, DIG. 6, DIG. 11, 100, 135

[56] References Cited
U.S. PATENT DOCUMENTS
3,980,353   9/1976   Hill ..................................... 308/79.1

*Primary Examiner*—Richard R. Stearns
*Attorney, Agent, or Firm*—Merriam, Marshall & Bicknell

[57] ABSTRACT

A bearing, particularly a railway bearing, is described wherein a thrust disc at one end of the axle is located between axially opposed thrust faces in the bearing housing. One of the thrust faces is provided by a number of arcuate elements assembled into a circumferential groove at that end of the housing outboard of the thrust disc, the arcuate elements being located and retained in position by a spacer ring.

4 Claims, 6 Drawing Figures

BEARINGS

This invention relates to bearings. The invention has been developed for axles of railway vehicles but has other applications.

According to one aspect of the invention we provide a bearing for an axle, the bearing comprising a housing; a bearing liner to engage the axle in the housing; a radially extending, circumferential thrust face on the housing adjacent one end thereof, said face facing in one direction; an internal groove in the housing between said face and said end; a thrust ring located in the groove and having a radially extending, circumferential thrust face opposite to, and facing in the opposite direction to said first mentioned thrust face, said ring comprising a plurality of arcuate elements assembled into said groove and which are located axially thereby; and a spacer ring located within the thrust ring to hold the elements thereof in said groove.

In this arrangement, the loads on the thrust face provided by the ring are taken directly by the housing by the abutment between the groove and the thrust ring.

In use a thrust disc will be located between the thrust faces on the housing and the thrust ring and secured to the end of the axle. Thrust washers will normally be provided between the thrust faces and the thrust disc. The housing will be closed at said one end by a cover plate so as to define with the housing, a reservoir for lubricant. There will be sealing means between the axle and the other end of the housing.

According to another aspect of the invention we provide an axle and bearing assembly, the bearing comprising a housing, a bearing liner in the housing and engaging the axle which enters the bearing from one end of the housing, means closing the other end of the housing and a seal assembly between the housing and the axle at said one end, said seal assembly comprising a sleeve fitted to the axle and a seal fixedly located within the sleeve and engaging a surface on the housing.

Said surface on the housing may be a wear piece in the form of a further sleeve fitted in the one end of the housing and surrounding the axle, the seal engaging the outer surface of the wear piece.

When applied to a railway vehicle, the bearing housing will be located in a journal box on the vehicle chassis.

Preferably, the bearing and axle assembly embodying the invention includes both aspects of the invention described above.

The invention will now be described in detail by way of example with reference to the accompanying drawings in which.

Figure 1:
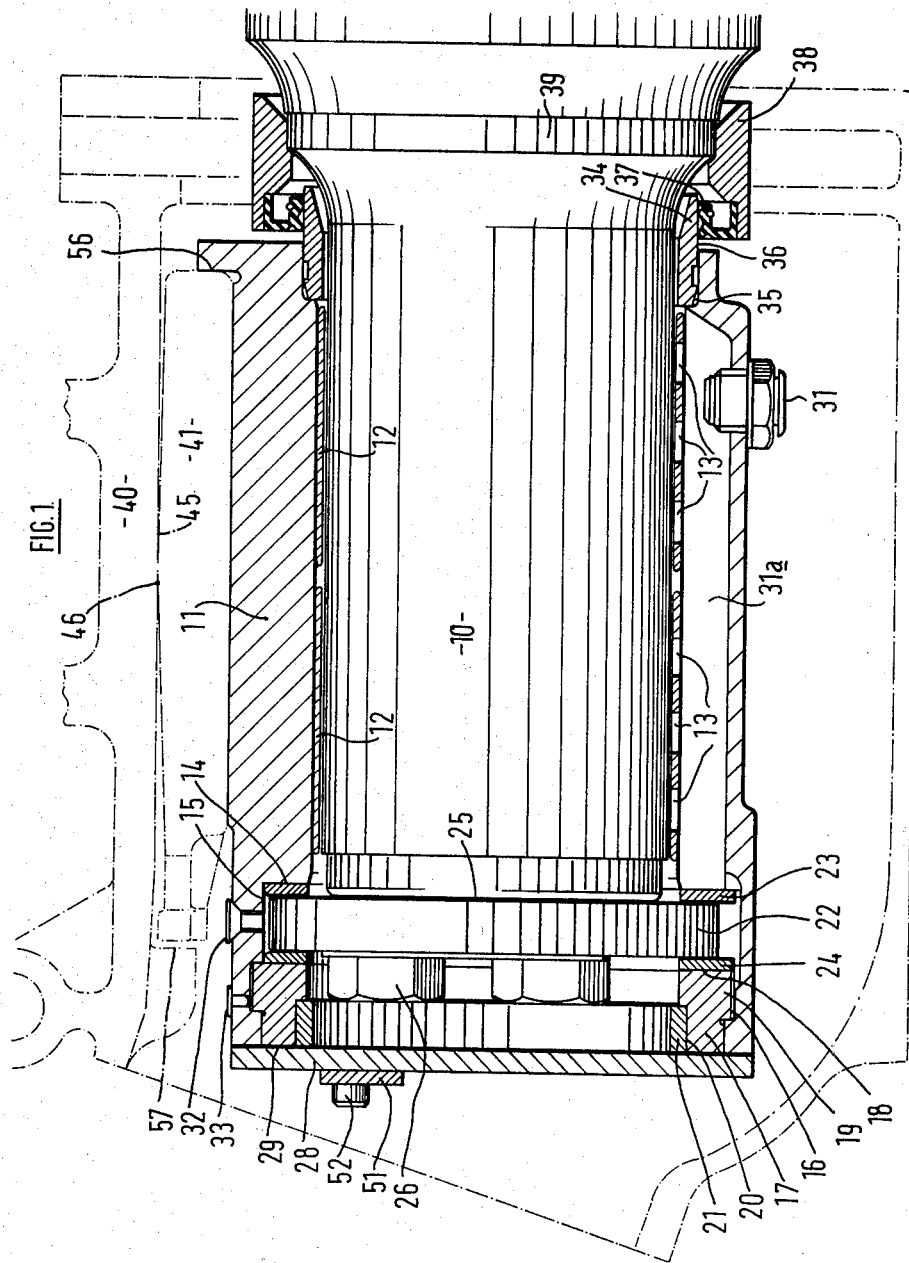
FIG. 1 is a section through a bearing and axle assembly embodying the invention on the line A—A of FIG. 2.
Figure 2:
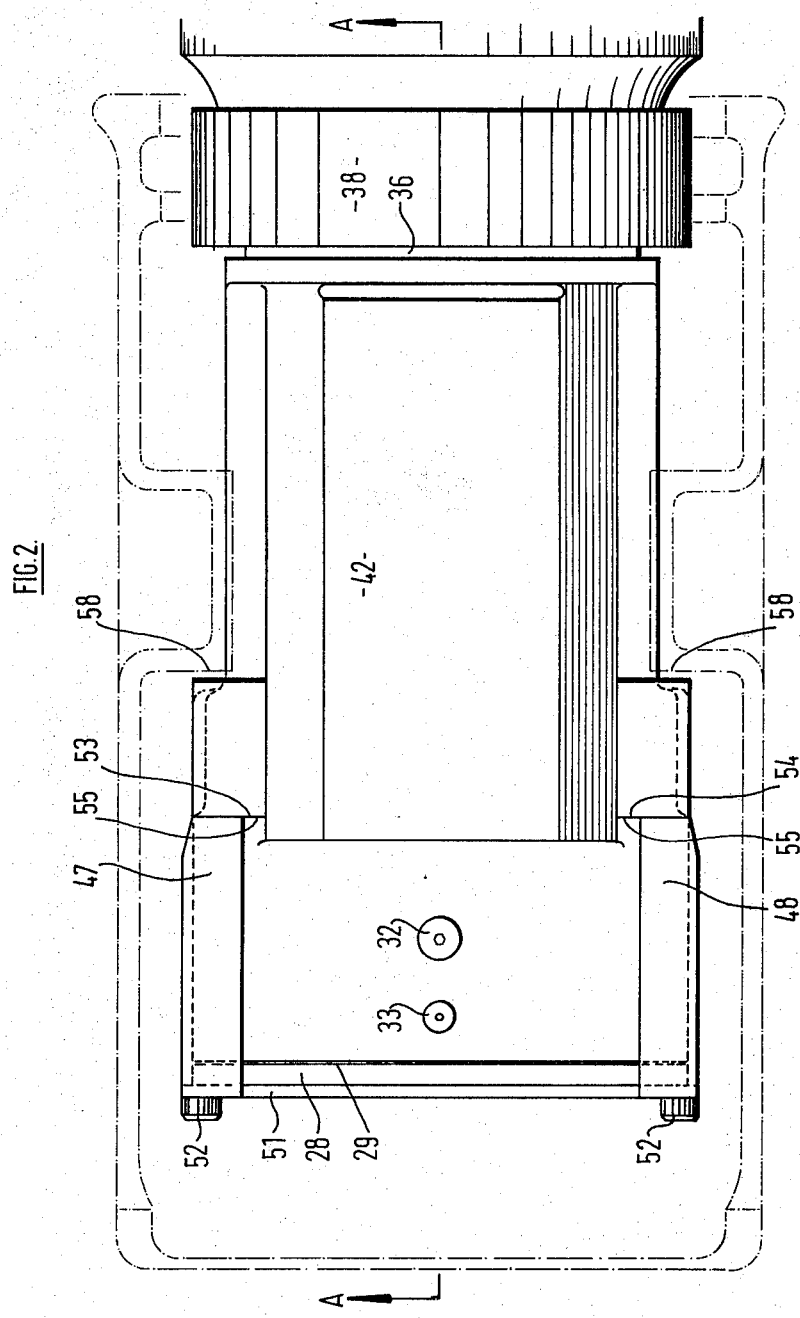
FIG. 2 is a plan view of the bearing and axle assembly.

Referring now to the drawings, a rotating axle of a railway vehicle is indicated at 10 and this is received within a bearing housing 11. Two cylindrical bearing liners 12 are pressed into the housing 11 and engage the journal surface of the axle. The lower part of each bearing liner is provided with apertures such as indicated at 13 to provide for circulation of lubricant as described in our British Pat. No. 1,464,177 to which reference should be made.

Figure 4:
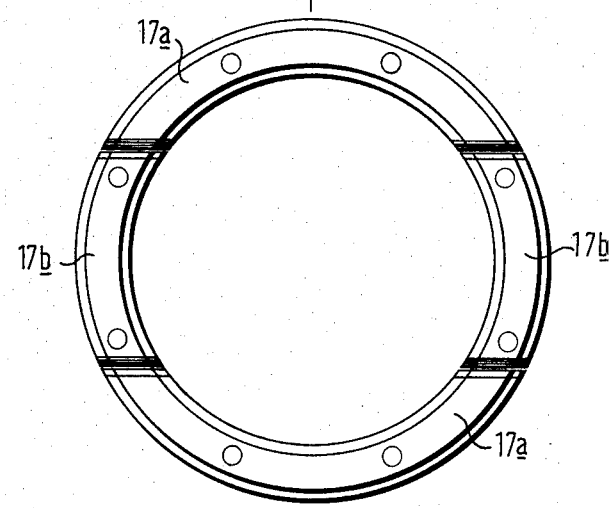
FIG. 4 is an end view of the thrust ring showing the elements.

Adjacent the left hand end of the housing 11 is provided a thrust face 14. This is a circumferential, radially extending face. The face is at the right hand end of a counterbore 15 in the left hand end portion of the housing 11 and formed in the counterbore is an internal groove 16. Located in the groove 16 is a thrust ring 17 which comprises four elements as shown in FIG. 4. The ring comprises two longer elements 17a and two shorter elements 17b. It will be noted that the ends of the elements are not radial but are parallel to a diameter of the ring. The thrust ring provides a thrust face 18 which extends radially and circumferentially and is opposite to, and faces in the opposite direction to, the thrust face 14. Each of the four elements of the thrust ring 17 is formed with an external rib 19 to fit into the groove 16 and the complete ring provides a counterbore 20. Fitted into the counterbore is a spacer ring 21 which, once the elements have been fitted into the groove 16, holds the elements in postion in the groove. The ring 21 is pressed into position.

Between the thrust faces 14 and 18 is located a thrust disc 22 and a set of thrust washers 23 and 24, the washer 23 being between the thrust disc 22 and the face 14 and the thrust washer 24 being between the thrust disc 22 and the face 18. The thrust disc 22 is secured to the left hand end 25 of the axle by three screws 26 which pass through a locking plate 27.

Figure 3:
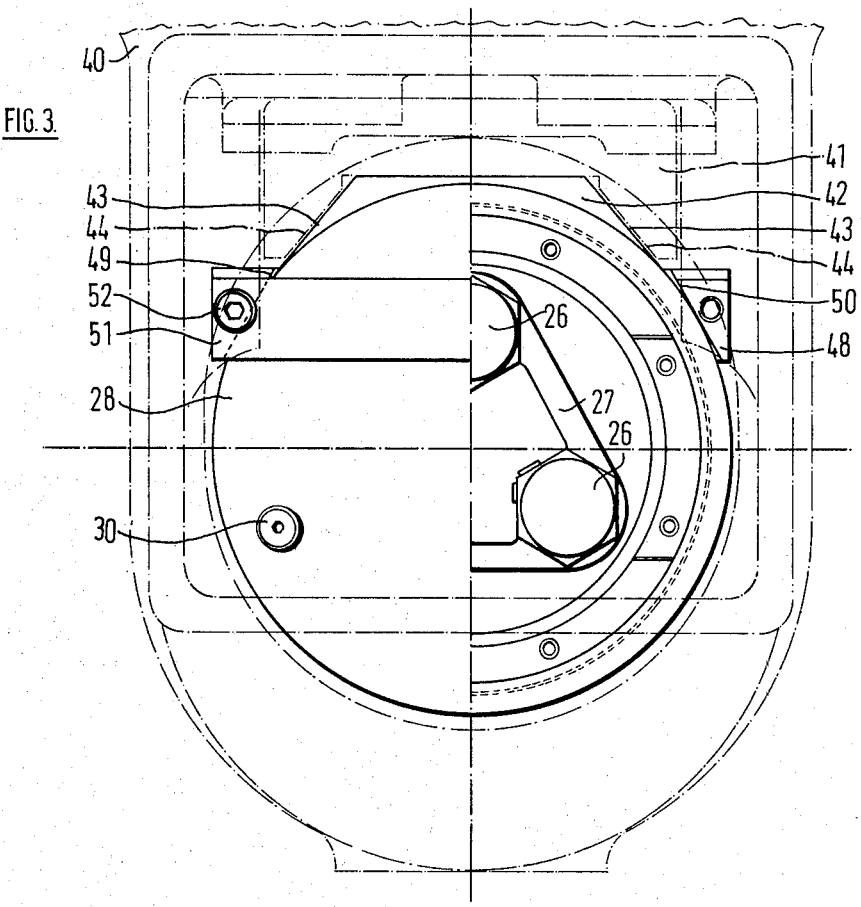
FIG. 3 is a view of the end of the assembly from the left in FIG. 1, the right hand part of FIG. 3 showing the assembly with the cover plate omitted.

The left hand end of the housing 11 is closed by a cover plate 28 which is sealed by a joint washer 29 to the left hand end of the housing 11 and the ring 17 and the cover plate 28 are held in position by a number of countersunk screws, one of which is shown at 30 in FIG. 3. The sole purpose of the screws is to hold the cover plate in position; they are not under stress.

A lubricator 31 is carried by the cover plate and in the base of the groove 16 there is a level plug 32 and a breather plug 33. However the lubricator could be located in the bottom of the housing 11 and communicating with a lubricant groove 31a.

At the right hand end of the housing there is provided a sleeve 34 which forms a wear piece for a seal and which is pressed into a counterbore 35 in the housing. The external surface 36 of the sleeve 34 engages a seal 37 which is pressed into a sleeve 38 which is in turn fitted onto a shoulder 39 on the axle.

The parts thus far described are assembled as follows. The sleeve 38 is pressed onto the shoulder 39 and the seal 37 pressed into the sleeve.

The sleeve 34 is pressed into the right hand end of the housing. The thrust washers 23 and 24 and the thrust disc 22 are assembled in the counterbore 15 at the left hand end of the housing. The four elements of the thrust ring 17 are then assembled in the groove 16 by first placing the elements 17a in position and then sliding the elements 17b into position. This assembly is permitted by the shape of ends of the elements. When all the elements are in position in the groove the ring 21 is pressed into position to hold the elements in the groove.

The assembled bearing housing is now slid over the end of the axle until the sleeve 34 engages within the seal 37 and the thrust disc 22 engages the left hand end 25 of the axle. The thrust disc 22 is then secured to the axle by the screws 26 which, having been tightened to the appropriate torque, are locked in position by the lock plate 27. The cover plate 28 and jointing washer 29 are then applied to the end of the housing to close it and the latter is filled with lubricant via the lubricator 31, air being allowed to escape via the level plug 32 and the breather 33 operating during use.

The bearing housing 11 is located within a journal box indicated generally at 40. It is prevented from rotating in the journal box by means of a steeple-back slipper wedge 41. As is clear from FIG. 3, the housing 11 has a projection 42 on its upper surface, the projection 42 having inclined surfaces 43 which engage complemtary inclined surfaces 44 on the wedge 41. The wedge has an upper surface 45 which engages with a downwardly facing surface 46 in the journal box so that the wedge 41 prevents the housing 11 from rotating.

The wedge is inserted into position, while the axle 10, fitted with the bearing assembly as previously described, is being advanced into the journal box 40. The axle 10 and bearing assembly are inserted from the right in the drawings into the journal box 40 approximately one third of the length of the housing. The wedge 41 is then inserted into the box from the left and the parts are pushed together to their final position.

Figure 5:
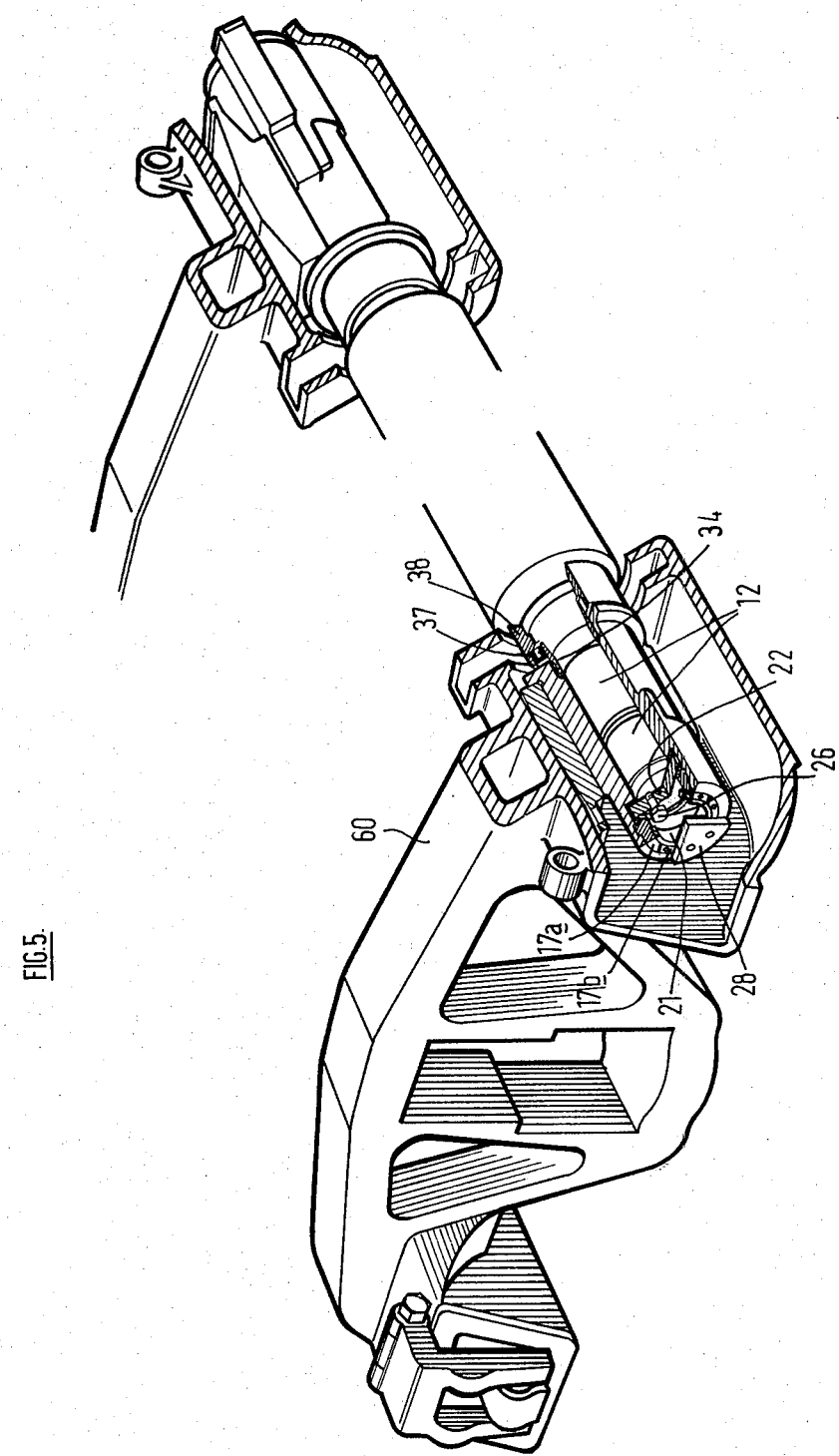
FIG. 5 is a broken away perspective view showing the relative positions of the axle, bearing and journal box.
Figure 6:
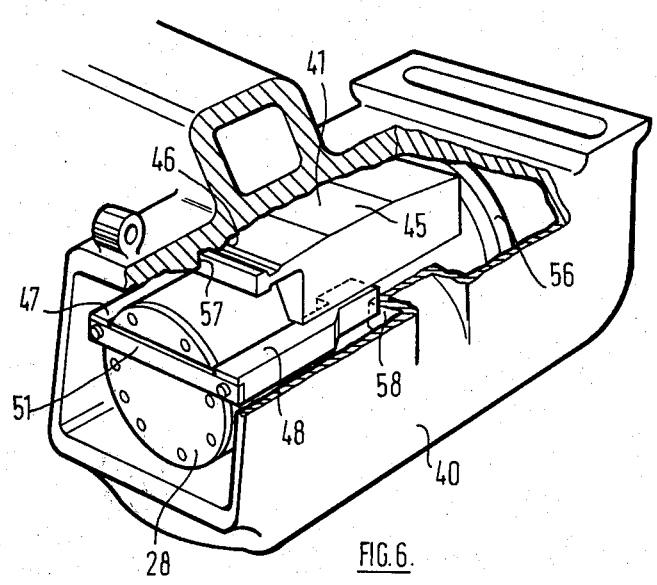
FIG. 6 is a broken away perspective view showing the bearing is located in a journal box.

While this assembly is being effected the vehicle chassis will be jacked up, the wheeled axles will be resting on the rails and each side frame 60, with which two journal boxes are integral, see FIG. 5, will be manoeuvred separately from the chassis until the bearings are properly located in the journal boxes. When all the side frames for the chassis have been assembled to the axles, the chassis is lowered and the side frames attached thereto.

The housing is located in a fore and aft direction within the journal box by means of the wedge 41 and thrust blocks 47 and 48. Movement of axle and housing towards the left is prevented by the wedge 41 which engages with a flange 56 on the housing 11 and a projecting face 57 in the journal box. Movement towards the right is prevented by the thrust blocks 47 and 48, which will engage the projecting surfaces 58 of lugs on the journal box side walls.

As is shown in FIG. 3, these thrust blocks have inclined inner surfaces 49 and 50 respectively which engage the outer surface of the housing. The left hand ends of the blocks are connected by a spring strip 51 secured to the blocks by screws 52. The spring strip is so arranged that when the screws 52 are tightened the right hand or free ends of the thrust blocks are caused to move towards one another.

After the housing has been placed in position in the journal box, the thrust blocks are placed in position with the screws 52 in a slack condition and are moved into position until abutment surfaces 53 and 54 on the blocks extend behind surfaces 55 on the housing. The screws 52 are then tightened up to bring the ends of the thrust blocks together and thus ensure that the abutments 53, 54 and 55 remain in engagement. The right hand ends 59 of the thrust blocks engage the projecting surfaces 58 of lugs 60 on the side walls of the box as mentioned above.

During running of the vehicle, the bearing will be lubricated as described in British Pat. No. 1,464,177.

The assembly of the bearing housing is an improvement on those heretobefore used since the thrust ring 17 transmits any load applied thereto directly to the housing via the side of the groove 16 and the cover plate 18 has to take no load. Moreover, the seal arrangement at the right hand end of the housing allows the seal to be inserted into the axle first and then the housing to be moved into position within the seal.

I claim:

1. A bearing for an axle, the bearing comprising a housing; a bearing liner to engage the axle in the housing; a radially extending circumferential thrust face on the housing adjacent one end thereof, said face facing in one direction; an internal groove in the housing between said face and said end; a thrust ring located in said groove and having a radially extending circumferential thrust face opposite to, and facing in the opposite direction to, said first mentioned thrust face, said ring comprising a plurality of arcuate elements assembled into said groove and which are located axially thereby; and a spacer ring located within said thrust ring to hold the elements thereof in said groove.

2. A bearing and axle assembly, the bearing comprising a bearing for an axle, the bearing comprising a housing; a bearing liner to engage the axle in the housing; a radially extending circumferential thrust face on the housing adjacent one end thereof, said face facing in one direction; an internal groove in the housing between said face and said end; a thrust ring located in the groove and having radially extending circumferential thrust face opposite to, and facing in the opposite direction to, said first mentioned thrust face, said ring comprising a plurality of arcuate elements assembled into said groove and which are located axially thereby; a spacer ring located within said thrust ring to hold the elements thereof in said groove; and a thrust disc secured to the end of the axle and located between the thrust faces on the housing and the thrust ring.

3. A bearing and axle assembly as claimed in claim 2 wherein the other end of the housing includes a seal assembly between the housing and the axle comprising a sleeve fitted to the axle and a seal fixedly located within said sleeve and engaging a surface on the housing.

4. A bearing and axle assembly as claimed in claim 3 wherein said surface on the housing comprises a wear piece surrounding the axle, said seal engaging the outer surface of the wear piece.

* * * * *